United States Patent
Fitzpatrick et al.

(10) Patent No.: US 11,518,968 B2
(45) Date of Patent: Dec. 6, 2022

(54) EXPEDITED METHOD FOR MAKING WHISKEY

(71) Applicant: Liberty Real Estate Holdings, LLC, Carlisle, PA (US)

(72) Inventors: Donald E. Fitzpatrick, Cherry Valley, MA (US); Patrick G. Wallace, Carlisle, PA (US)

(73) Assignee: LIBERTY REAL ESTATE HOLDINGS, LLC, Carlisle, PA (US)

( * ) Notice: Subject to any disclaimer, the term of this patent is extended or adjusted under 35 U.S.C. 154(b) by 314 days.

(21) Appl. No.: 16/772,605

(22) PCT Filed: Aug. 16, 2019

(86) PCT No.: PCT/US2019/046795
§ 371 (c)(1),
(2) Date: Jun. 12, 2020

(87) PCT Pub. No.: WO2020/037191
PCT Pub. Date: Feb. 20, 2020

(65) Prior Publication Data
US 2020/0392436 A1    Dec. 17, 2020

Related U.S. Application Data

(60) Provisional application No. 62/764,676, filed on Aug. 16, 2018.

(51) Int. Cl.
*C12G 3/07*    (2006.01)
*C12H 6/02*    (2019.01)
*C12H 1/22*    (2006.01)

(52) U.S. Cl.
CPC ............... *C12G 3/07* (2019.02); *C12H 1/22* (2013.01); *C12H 6/02* (2019.02)

(58) Field of Classification Search
CPC ............... C12H 1/22; C12H 6/02; C12G 3/07
See application file for complete search history.

(56) References Cited

U.S. PATENT DOCUMENTS 2,586,133 A    2/1952   Wilken
4,073,955 A    2/1978   Koppelman
(Continued)

OTHER PUBLICATIONS

Barton, "Cracking the Aging Code", Whiskey Advocate, 2018, pp. 62.
(Continued)

*Primary Examiner* — Vera Stulii
(74) *Attorney, Agent, or Firm* — Stradley Ronon Stevens & Young, LLP

(57) ABSTRACT

A method for expediting the production of aged whiskey. The method uses a system including a tank with a lid containing charred wood slabs and a degasser connected via a conduit to a tube having a vacuum valve, a pressure release valve, and a vacuum gauge. Distillate is delivered to the tank and cyclical steps are applied to age the distillate while regulating the amount of vacuum developed in the tank. The degasser is energized and the vacuum valve is opened, subjecting the distillate to vacuum. The vacuum valve closed and the degasser is de-energized. The pressure in the system is held for approximately one minute. The pressure release valve is slowly opened, allowing the pressure to neutralize to atmospheric pressure. The pressure release valve is closed and the system sits for at least 1.5 hours. Finally, these cyclical steps are repeated for 21 days or more.

20 Claims, 7 Drawing Sheets

(56) References Cited

U.S. PATENT DOCUMENTS

| | | |
|---|---|---|
| 4,210,676 A | 7/1980 | Dudar et al. |
| 6,344,226 B1 | 2/2002 | Zimlich, III |
| 7,594,468 B2 | 9/2009 | Kania et al. |
| 2003/0110951 A1 | 6/2003 | Tyer et al. |
| 2010/0092636 A1 | 4/2010 | Watson et al. |
| 2013/0149423 A1 | 6/2013 | Lix |
| 2014/0154383 A1* | 6/2014 | Beck .................... C12G 1/0206 99/277.1 |
| 2020/0255777 A1 | 8/2020 | Fearnside et al. |

OTHER PUBLICATIONS

International Search Report and Written Opinion dated Oct. 17, 2019 for corresponding International Patent Application No. PCT/US2019/046795.

* cited by examiner

EXPEDITED METHOD FOR MAKING WHISKEY

TECHNICAL FIELD

The present invention relates generally to methods for producing alcoholic beverages for human consumption and, more particularly, to an expedited method for making whiskey.

BACKGROUND OF THE INVENTION

Alcoholic beverages such as vodka, tequila, rum, bourbon, scotch, brandy, and the like are generally produced through a distillation process. Once produced, in order to improve the taste and smoothness of the beverage, many beverages are aged before they are sold for consumption. Alcoholic beverages such as whiskey traditionally have required a prolonged aging period. The conventional aging period is usually longer than 3 years. Scotch whisky, for example, typically takes an average of 12 or more years to mature. Bourbon and other "American Whiskeys" such as rye, wheat, and barley typically take 6 to 9 years.

In the past, whiskey distillates such as bourbon and scotch, for example, have been aged in wood (typically oak) barrels or casks. The distillates are aged in the wooden containers in order to remove unwanted components and to impart certain colors, flavors, and fragrances to enhance the smoothness and taste of the beverage. During the aging process, the distillates can react with components in the wood, such as lignins, tannins, and carbohydrates. After a sufficient aging period, typically 2 to 6 years (and sometimes more than 10 years), the high-proof solution is drained from the container and bottled for commercial sale. Distillation and aging techniques have changed little over the last several hundred years.

Unfortunately, the costs of conventional aging processes are enormous, often accounting for half to two-thirds or even more of the cost of the beverage to consumers. Distillers must purchase or manufacture expensive oak barrels (new ones each time in the case of whiskeys like bourbon and rye). Further, to ensure product quality, the oak barrels should be stored in warehouses under carefully controlled temperature and humidity conditions for very long periods of time. The barrels occupy a significant amount of space. Still further, much of the alcoholic beverage can be lost during aging due to evaporation (called the "angels' share") through the pores of the barrels.

In addition, although it provides the best method to date for enhancing and improving the flavor of whiskey, natural barrel aging limits the chemical reactions which are believed to improve spirit flavor and quality. For instance, oxidation and esterification reactions which are believed to assure spirit smoothness and flavor tend to be inefficient and unable to proceed to completeness at the temperatures which are preferred for limiting loss of the beverage due to evaporation. Thus, a balance must be struck with aging processes between increased temperature in order to promote desired chemical reactions and lower temperature desired to limit beverage evaporation.

The deficiencies and disadvantages associated with conventional aging processes outlined above have prompted attempts to develop methods for rapidly aging alcoholic distillates. For instance, Lost Spirits Distillery of Los Angeles, Calif., claims to catalyze esterification (the creation of pleasant, usually fruity flavors) and polymer degradation that happens in a barrel over time, resulting in a spirit that tastes several years old, in 6 days. The distillate is heated with a "tea bag" of oak pieces treated with water or wine to strip some tannins, causing esterification of weak acids. The liquid and oak are exposed to high-intensity light, triggering degradation of polymer structures on the oak, which develops carboxylic and phenolic acids and phenols, creating specific flavors. The liquid is heated again to chemically bind phenols to alcohols and esters for additional complex flavors. The method is described in S. Barton, "Cracking the Aging Code," Whiskey Advocate at 62 (Spring 2018).

Some have patented or attempted to patent methods that ostensibly avoid conventional aging processes. For example, U.S. Pat. No. 4,210,676 issued to Dudar et al. is directed to a process and apparatus for the acceleration of the ripening of spirits. According to Dudar et al., distilled spirits are irradiated with ultrasonic radiation in the presence of wood staves. Specifically, the '676 patent teaches applying ultrasonic energy in an amount of 1.7 Watts per liter of alcohol.

Similarly, U.S. Patent Application Publication. No 2003/0110951 filed by Tyler et al. is directed to a method for rapidly aging alcoholic beverages and to the beverages produced by the method. During the method, a consumable alcoholic feedstock is contacted with ultrasonic energy at a power of at least about 3 Watts/liter. If desired, a variety of flavorants can also be contacted with the alcohol and ultrasonic energy in order to flavor the beverage. The energy can push the maturation chemistry of the alcohol to completion quickly and produce a consumable product which is unique in characterization and can have flavor and smoothness surpassing that of consumable alcohols aged in slower, more traditional methods.

U.S. Patent Application Publication No. 2013/0149423 filed by Cleveland Whiskey LLC discloses a whiskey making method. According to the method, distillate is placed into a container in contact with a wood surface area. The pressure within the container is controllably varied during a 24-hour cycle so that the pressure varies at least 1 atm between a maximum pressure and a minimum pressure. The pressure-varying steps are repeated for a period less than nine months. The goal of the method is to make a whiskey having taste qualities similar to one aged for a conventional aging period (e.g., usually 3 years or more).

FIG. 1 is a schematic diagram of the whiskey-making method taught by the '423 Publication. The method uses a container 10 and distillate 12 placed within the container 10 so that the distillate 12 contacts a wood (e.g., oak) surface area 14. The container 10 can be scaled and pressure within the container 10 can be controllably varied. After completion of the pressure-varying steps, the high-proof solution can be drained from the container 10 into bottles 18 for commercial sale.

U.S. Pat. No. 2,586,133 issued to Wilken is directed to a method of treating all kinds of potable distilled spirits to make them more palatable. The characterizing feature of the method is the repeated application to distilled spirits for short periods of vacuum. The vacuum is controlled in amount to generate small bubbles which rise throughout the body of the spirits to the surface thereof and are removed under the pull of the vacuum. Generally, a vacuum of 25 inches of mercury (Hg) gauge pressure is the preferred maximum. Between each period of vacuum treatment, the spirits are subjected to a short period or periods of pressure (above atmospheric pressure). During the cyclic treatments the spirits should be warm but not over 90° F. The maximum number of cycles is about five or six cycles. During the periods of pressure treatment, but not during the periods of vacuum treatment, the spirits are preferably subjected to mechanical agitation. Each treatment period is relatively short, a matter of minutes, and the complete operation requires only a matter of hours. In some instances, Wilken claims that satisfactory taste improvement can be obtained in about one-half hour.

Despite the many attempts to develop rapid aging methods for distilled alcoholic beverages, some of which have been summarized above, to date no method has gained any real commercial importance. Therefore, a need exists for a method capable of rapidly aging alcoholic beverages which can provide a consumable beverage equivalent to traditionally aged products in taste, aroma, smoothness, color, as well as other characteristics.

BRIEF SUMMARY OF THE INVENTION

To meet these and other needs, and in view of its purposes, the present invention provides various embodiments of a method for expediting the production of aged whiskey. The method uses a system including a tank with a lid and a degasser connected via a conduit to a tube having a vacuum valve, a pressure release valve, and a vacuum gauge. Charred wood slabs, each with at least one clean end grain, are submerged in clean water. The slabs are removed from the water and placed in the tank. Pucks are positioned at intersections between the slabs to prevent the slabs from floating in the tank. Distillate to be aged is delivered to the tank.

The method includes cyclical steps of aging the distillate while regulating the amount of vacuum developed in the tank. The degasser is energized and the vacuum valve is opened to subject the distillate to vacuum. The vacuum valve is closed and the degasser is de-energized. The pressure in the system is held for approximately one minute. The pressure release valve is slowly opened, allowing the pressure to neutralize to atmospheric pressure. The pressure release valve is closed and the system is allowed to sit for at least 1.5 hours. Finally, these cyclical steps are repeated for 21 days or more.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
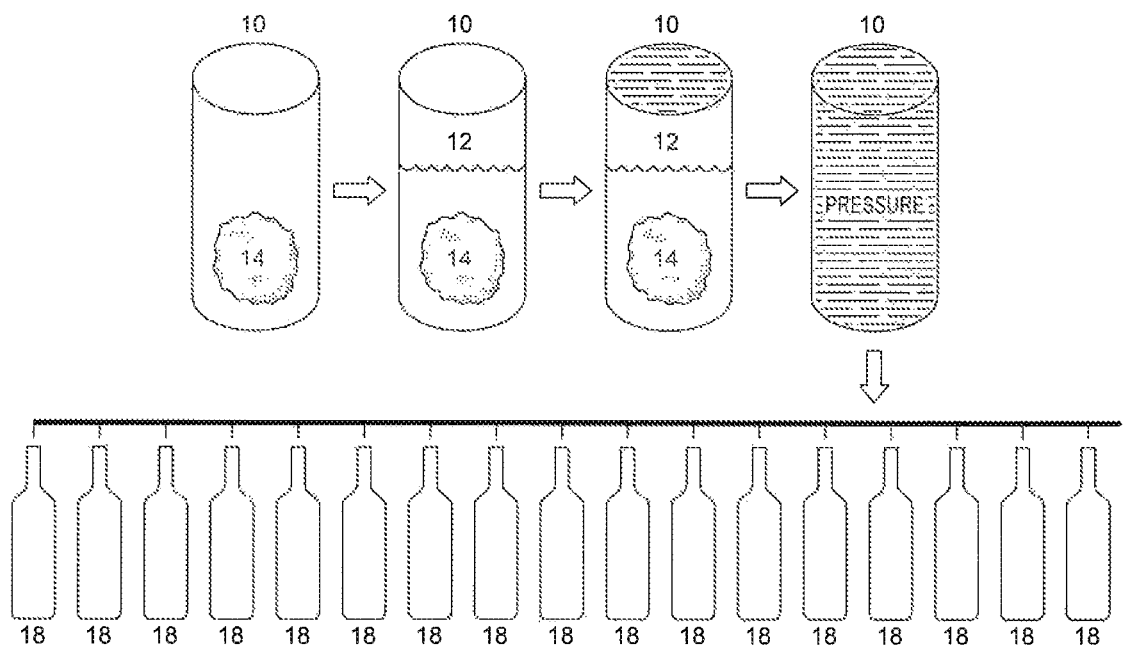
FIG. 1 is a schematic diagram of the whiskey-making method taught by U.S. Patent Application Publication No. 2013/0149423.

Various embodiments of an expedited method for producing aged whiskey are disclosed below. Generally, the method uses a system 100 that includes a degassing unit or vacuum tank 20. The capacity of the tank 20 is preferably five gallons, although the method could use other sizes. The tank 20 can be at least partially made of wood. The tank 20 may instead be a non-wood and/or non-porous material, such as metal (e.g., steel or stainless steel), ceramic, glass, or plastic.

Slabs 30 of pre-treated oak (char) are submerged in distilled spirits or distillate 50 positioned in the tank 20. A vacuum is applied for a pre-determined time at a pre-determined inches of vacuum. This step of the method draws the vapor from the wood. After a pre-determined time, the vacuum is neutralized to atmospheric pressure. The distillate 50 is then drawn into the wood replacing the removed vapor. These method steps are repeated for a pre-determined number of times, controlling the vacuum and timing, pushing and pulling the distillate 50 in and out of the wood. By "predetermined" is meant determined beforehand, so that the predetermined characteristic must be determined, i.e., chosen or at least known, in advance of the start of the method.

With that overview of the method in mind, more detailed method steps are outlined with reference to the drawing, in which like reference numbers refer to like elements throughout the various figures that comprise the drawing. Step 1 of the method is directed to preparation of the wood slabs 30 used in the method. This step is very important; it has been determined that the size and amount of wood slabs 30 directly affects the results achieved. If the wood slabs 30 are too small, then the wood becomes saturated and ineffective in the method. If too much wood is used, the end product has an overly dark appearance and too much of a smoky flavor.

Two inches by two inches American White Oak wood pieces are cut into lengths of ten inches and charred using a virgin charcoal grill. The oak pieces are turned to ensure an even char. The charred oak pieces are then immediately submerged in a water bath. Each piece of ten inches is then cut in half resulting in two slabs 30 of five inches with each slab 30 having at least one clean end grain. It is important to have one clean end grain so the distilled spirits can penetrate the wood through the growth rings. The slabs 30 are then submerged in clean water which is changed daily for a period of five days. This step keeps the end product crystal clear and eliminates a smoky look and taste.

Figure 2:
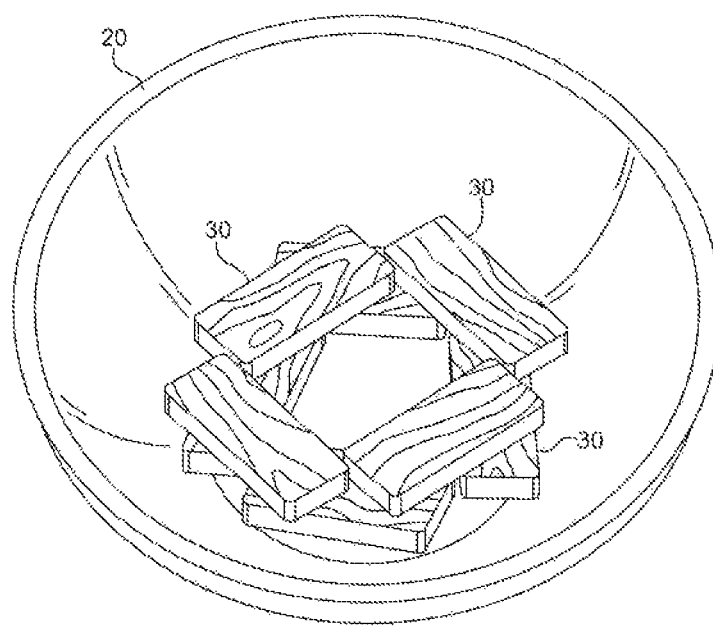
FIG. 2 illustrates one step of an embodiment of the method according to the present invention in which wood slabs are placed carefully in the tank of the system used by the method.
Figure 3:
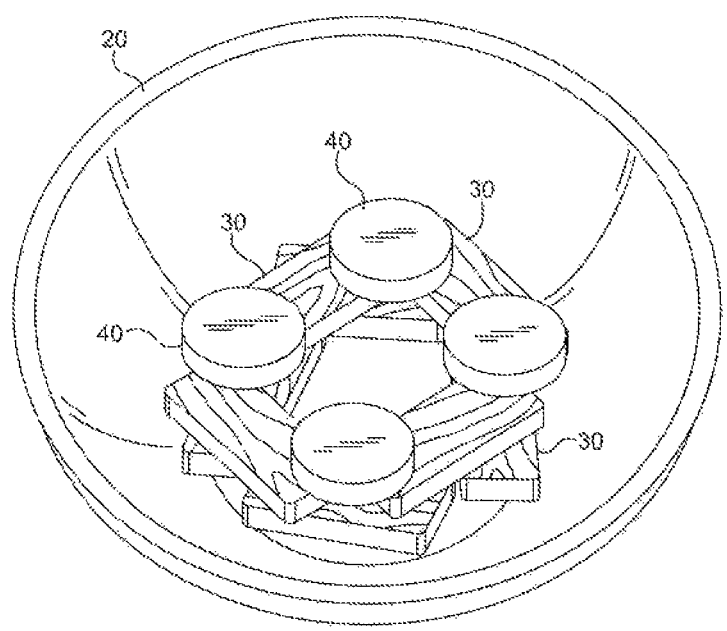
FIG. 3 illustrates another step of an embodiment of the method according to the present invention in which four pucks are placed at the intersections of the wood slabs to keep the wood slabs from floating in distillate placed in the tank.

In step 2 of the method, the wood slabs 30 are placed in the tank 20 in the following order: four slabs 30 are placed in a square, to form a first layer in the bottom of the tank 20, then four more slabs 30 are placed diagonally on top of the first layer of four slabs 30, which makes a total of eight slabs 30 in two layers. This configuration is illustrated in FIG. 2. Next, four pucks 40 of food-grade glass are placed at the intersections of the four top slabs 30 to keep the wood from floating in the distillate 50. This configuration is illustrated in FIG. 3.

Figure 4:
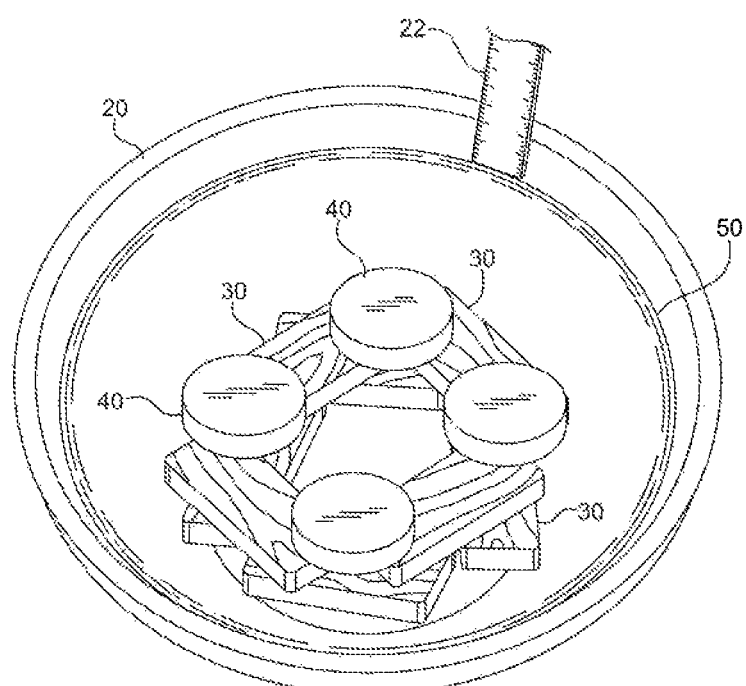
FIG. 4 illustrates the wood slabs, pucks, and distillate after all are placed in the tank of the system completing yet another step of an embodiment of the method according to the present invention.

The five-gallon tank 20 is then filled with 4.75 gallons of distillate 50, slightly less than the 5-gallon capacity of the tank 20, to allow room for expansion. Thus, the tank 20 has a capacity (five gallons, for example) and the distillate 50 is delivered to the tank 20 in an amount sufficient to fill the tank 20 to about 95% of its capacity. FIG. 4 illustrates the wood slabs 30, glass pucks 40, and distillate 50 in the tank 20. The ruler 22 shows that the top level of the distillate 50 is about 1.5 inches below the top of the tank 20.

Figure 5:
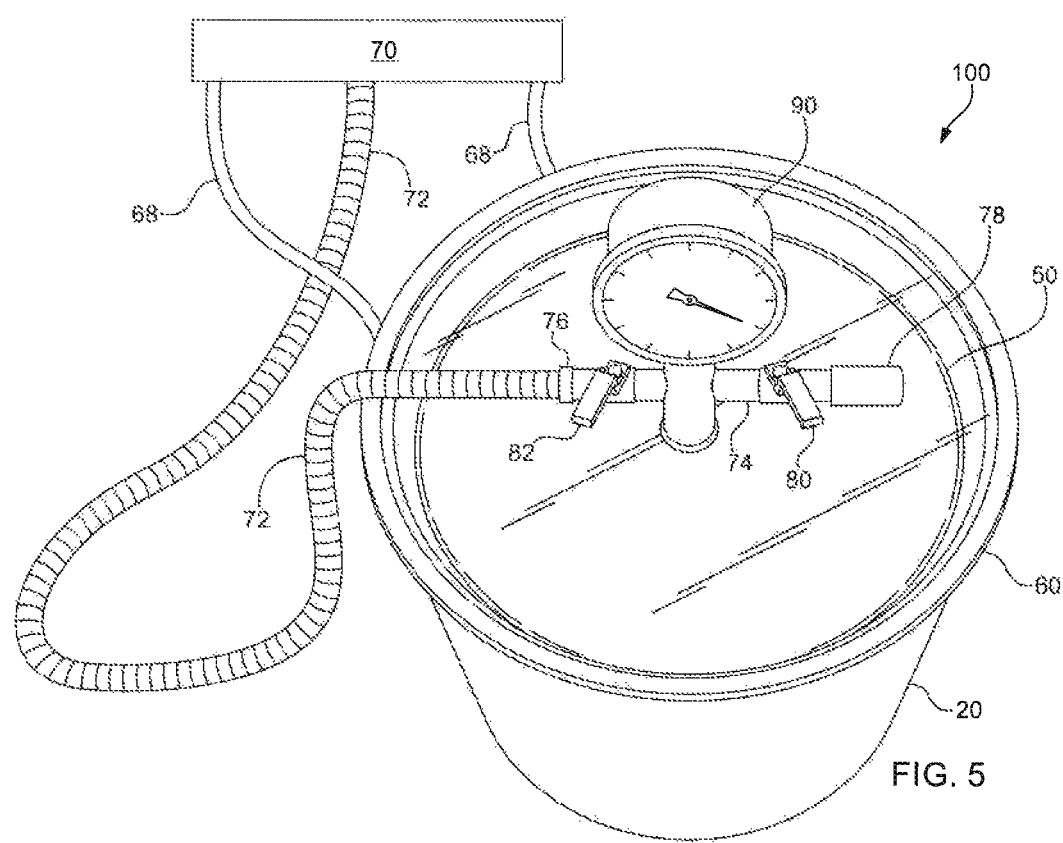
FIG. 5 illustrates the configuration of the system used to implement the steps of an embodiment of the method according to the present invention that age the distillate.

The method steps used to age the distillate 50 now begin. In step 3 of the method, a lid 60 is placed on top of the tank 20. The lid 60 may be made of 0.75 inch plexi-glass. The tank 20 is located proximate to a 1-stage vacuum pump or degasser 70, which is driven by an electric motor, connected by electric wires 68 to a conventional power outlet. The degasser 70 may be of conventional design. The degasser 70 is connected to a tube 74 (which may be metal) via a conduit 72 (which may be plastic). The conduit 72 is connected to the tube 74 by a coupling 76. The tube 74 carries a first (vacuum) valve 80, a second (pressure release) valve 82, and a vacuum gauge 90. The tube 74 is sealed by a cap 78. This configuration is illustrated in FIG. 5. In combination with the vacuum valve 80 and the pressure release valve 82, the degasser 70 regulates the amount of vacuum developed in the conduit 72, tube 74, and tank 20. The vacuum gauge 90 measures the difference in the levels of the mercury (Hg) from 0 inches at atmospheric pressure up to about 30 inches of Hg at the best vacuum attainable.

The vacuum valve 80 is a device that directs the flow of air or fluid to create a vacuum. Vacuum valves are operated inside machines that use gauges and switches to control the flow of air or pressure inside the valve and release the pressure when needed for its application. A vacuum is created by the vacuum valve 80 by controlling the intake of air on one end of the vacuum valve 80 and closing it off from being released elsewhere. The pressure creates a vacuum inside the vacuum valve 80 and it provides a suction action.

Vacuum valves are used when a vacuum must be maintained in a closed system, such as the system 100 described and illustrated in this document. Gate, in-line, and angle valves are the most common types of vacuum valves for high-vacuum applications. Gate valves (also known as knife valves or slide valves) are linear motion valves in which a flat closure element slides into the flow stream to provide shut-off. In-line valves have their inlet port positioned at a parallel to the outlet port, but not necessarily axial with the inlet port. Angle valves have their inlet port positioned at a right angle to the outlet port.

Additional valve types include ball, butterfly, conductance controllers, diaphragm, gas control or leak valves, relief valves, and straight-through valves. Ball valves are quarter-turn, straight-through flow valves that have a round closure element with matching rounded seats that permit uniform sealing stress. Butterfly valves are quick-opening valves that consist of a metal circular disc or vane with its pivot axes at right angles to the direction of flow in the tube, which when rotated on a shaft seals against seats in the valve body. Conductance controllers alter the conductance through the vacuum system by modifying the mean free path that the gas molecules must take. Diaphragm valves use a flexible diaphragm to separate the flow stream from the closure element. Gas metering, throttling, or leak valves control the flow of gas into a chamber or process vessel. Vacuum or pressure relief valves protect chambers or components from excesses in vacuum or pressure that would otherwise deform or damage the component. Straight-through valves have their inlet port positioned at a parallel to the outlet port as well as axial with the inlet port.

Step 3 of the method begins with both valves 80, 82 in their closed positions. The degasser 70 is then turned on, or energized, and the vacuum valve 80 is opened to subject the distillate 50 to vacuum. The vacuum valve 80 remains open until bubbles appear, indicating that gas is coming to the surface of the distillate 50. At this point, the vacuum gauge 90 will typically read in the range 20-29 inches of mercury (Hg). The vacuum valve 80 is then closed and the degasser 70 is turned off (or de-energized). The pressure in the system is then held for approximately one minute (60 seconds). Thereafter, the pressure release valve 82 is opened slowly (over a period of 2-to-3 seconds), allowing pressure to neutralize to zero, or atmospheric pressure, which causes the bubbles to stop. The pressure release valve 82 is then closed, and the system sits for at least 1.5 hours.

The negative pressure in the wood slabs 30 from removed vapor draws in the distillate 50. It is critical to draw out the vapor from the wood slabs 30 in controlled increments to ensure that gasses or vapor remain in the wood slabs 30 for the next degassing cycle. The steps of aging the distillate 50 are conducted five to six times per day, forming a cyclic pattern, with a minimum of 1.5-hour intervals. This cyclic pattern of aging steps allows the distillate 50 in the wood slabs 30 to pick up tannin and color. The steps of aging the distillate 50 are repeated daily for 21 days or more. Every day the vacuum gauge 90 will show a higher reading until it stabilizes at a vacuum of 25 inches to 29 inches of Hg. The vacuum gauge 90 will then stay in this range for the remaining days of the aging process. A taste and sight test is conducted when the product shows a dark amber color. If the product fails to meet expectations, the product is held in the system 100 until such time as the product meets desirable results. During this time period taste and sight tests are ongoing. Excellent results have been achieved in as little as a 21-day period.

Example

An example batch analysis follows. The following example is included to more clearly demonstrate the overall nature of the invention. This example is exemplary, not restrictive, of the invention.

| BATCH ANALYSIS E7 | | | |
| --- | --- | --- | --- |
| DATE | BATCH IN | BATCH OUT | APPEARANCE AND TASTE |
| 5 Jun. 2018 | E7 | | This batch was originally labeled E5. Batch was pulled based on color, however, product taste did not meet expectations. Batch was then placed back in the vacuum chamber Jun. 23, 2018. |
| 6 Jun. 2018 | 9:00 a.m. | 60 sec | |
|  | 12:30 p.m. | 45 sec | |
|  | 9:40 p.m. | 60 sec | |
| 7 Jun. 2018 | 7:30 a.m. | 80 sec | |
|  | 11:30 a.m. | 60 sec | |
|  | 4:30 p.m. | 45 sec | |
|  | 10:45 p.m. | 60 sec | |
| 8 Jun. 2018 | 9:30 p.m. | 60 sec | |
|  | 2:30 p.m. | 60 sec | |
|  | 4:30 p.m. | 80 sec | |

-continued

BATCH ANALYSIS E7

| DATE | BATCH IN | BATCH OUT | BATCH APPEARANCE AND TASTE |
|---|---|---|---|
| 9 Jun. 2018 | 7:00 a.m. | 60 sec | |
| | 12:30 p.m. | 60 sec | |
| | 4:30 p.m. | 60 sec | |
| | 8:30 p.m. | 80 sec | |
| 10 Jun. 2018 | 7:30 a.m. | 60 sec | |
| | 5:00 p.m. | 60 sec | |
| | 10:30 p.m. | 60 sec | |
| 11 Jun. 2018 | 8:30 a.m. | 80 sec | |
| | 1:30 p.m. | 60 sec | |
| | 6:30 p.m. | 60 sec | |
| | 11:30 p.m. | 60 sec | |
| 12 Jun. 2018 | 7:30 a.m. | 60 sec | |
| | 1:30 p.m. | 80 sec | |
| | 7:00 p.m. | 60 sec | |
| | 11:20 p.m. | 60 sec | |
| 13 Jun. 2018 | 8:00 a.m. | 60 sec | |
| | 12:00 p.m. | 80 sec | |
| | 5:30 p.m. | 60 sec | |
| | 11:00 p.m. | 60 sec | |
| 14 Jun. 2018 | 7:00 a.m. | 60 sec | |
| | 12:30 p.m. | 60 sec | |
| | 9:30 p.m. | 80 sec | |
| 15 Jun. 2018 | 8:30 a.m. | 60 sec | |
| 17 Jun. 2018 | 6:30 p.m. | 80 sec | |
| | 12:30 a.m. | 60 sec | |
| 18 Jun. 2018 | 9:00 a.m. | 60 sec | |
| | 1:30 p.m. | 60 sec | |
| | 6:00 p.m. | 60 sec | |
| | 11:00 p.m. | 60 sec | |
| 23 Jun. 2018 | 10:45 a.m. | 60 sec | Product placed back in system. |
| | 1:10 p.m. | 60 sec | |
| 24 Jun. 2018 | 9:00 a.m. | 60 sec | |
| | 12:30 p.m. | 60 sec | |
| | 9:10 p.m. | 60 sec | |
| | 11:00 p.m. | 60 sec | |
| 25 Jun. 2018 | 9:30 a.m. | 80 sec | |
| | 12:30 p.m. | 60 sec | |
| 26 Jun. 2018 | 9:30 a.m. | 60 sec | |
| | 1:30 p.m. | 60 sec | |
| | 3:30 p.m. | 60 sec | |
| | 8:00 p.m. | 60 sec | |
| 27 Jun. 2018 | 7:00 a.m. | 60 sec | |
| | 2:30 p.m. | 60 sec | |
| | 4:30 p.m. | 60 sec | |
| | 7:30 p.m. | 60 sec | |
| 28 Jun. 2018 | 8:30 a.m. | 60 sec | |
| | 3:30 p.m. | 60 sec | |
| | 10:20 p.m. | 60 sec | |
| 29 Jun. 2018 | 7:30 a.m. | 60 sec | |
| | 1:00 p.m. | 60 sec | |
| | 7:30 p.m. | 60 sec | |
| 1 Jul. 2018 | 9:00 a.m. | 60 sec | |
| | 2:30 p.m. | 60 sec | |
| | 8:30 p.m. | 60 sec | |
| 2 Jul. 2018 | 8:30 a.m. | 60 sec | |
| | 1:00 p.m. | 60 sec | |
| | 7:00 p.m. | 60 sec | |
| | 10:30 p.m. | 60 sec | |
| 3 Jul. 2018 | 9:00 a.m. | 60 sec | |
| | 2:00 p.m. | 60 sec | |
| | 8:30 p.m. | 60 sec | |
| 4 Jul. 2018 | | | Product pulled. Batch E7 has been rated as excellent in taste and color. |

In the above example, the vacuum was largely held for 60 seconds (with few exceptions). In another example, the vacuum was held for 60 seconds throughout the first 15 days of the method. After 15 days, the vacuum was held for an additional 1-2 minutes per day until the vacuum was held for 11 minutes on the last (thirty-first) day. It was determined that holding pressure for longer periods of time allows for deeper penetration of the alcohol into the wood which results in more tannin, color, and taste.

Once the product has achieved an acceptable taste and color, the final step 4 of the method is implemented. The product is siphoned from the tank 20 into an activated charcoal filter to remove any charred particles that the product might carry. Thereafter, the product is ready for bottling.

Figure 6:
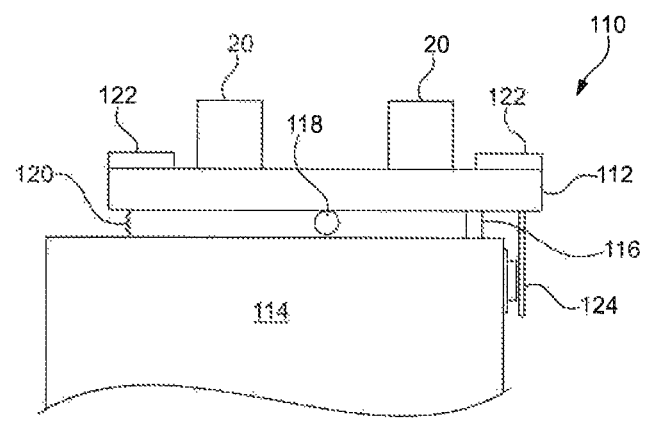
FIG. 6 illustrates an apparatus that can be incorporated into an embodiment of the method according to the present invention to oxygenate the finished product.

FIG. 6 illustrates an example apparatus 110 that can be incorporated into the system 100 used by the method to oxygenate the finished product. The apparatus 110 allows the method to include steps for moving the liquid. The additional steps to the method include: (1) for the pressure-equalization or pressure-neutralization step, the introduction of an oxygen-enriched atmosphere via an oxygen concentrator, or other mechanism, into the tank 20 to achieve pressure neutrality; and (2) moving the liquid distillate in the tank 20 at pre-determined stages in the method. Although the apparatus 110 is suitable, other apparatus could also be incorporated into the system 100 to enable the method to oxygenate the finished product.

As shown in FIG. 6, the apparatus 110 has a platform 112 on which multiple tanks 20 are supported. (Two tanks 20 are illustrated; the apparatus 110 can accommodate more than two tanks 20.) In turn, the platform 112 is supported on a table 114 through a level stop 116 located proximate one end of the platform 112, a fulcrum 118 located proximate the center of the platform 112, and one or more springs 120 located proximate the end of the platform 112 opposite the level stop 116. The springs 120 help to return the platform 112 to level. Variable weight units 122 are positioned on the opposite ends of the platform 112. An adjustable speed and distance cam 124 is provided to move the platform 112. Balanced tanks 20 are important to ensure ease of movement of the liquid, and the apparatus 110 helps to balance the tanks 20.

It is helpful to move the liquid when an oxygen-rich atmosphere is introduced into the tank 20. When more of the changing surface comes into contact with the oxygen-enriched atmosphere that is introduced, the oxygenation absorption becomes more effective. The purpose for the apparatus 110 illustrated in FIG. 6 is to mildly move the tanks 20 to cause the liquid to change the surface area of liquid exposed to the oxygen-rich atmosphere at the top of the tanks 20. Other methods for moving the liquid may be used, such as a paddle movement internally.

Figure 7:
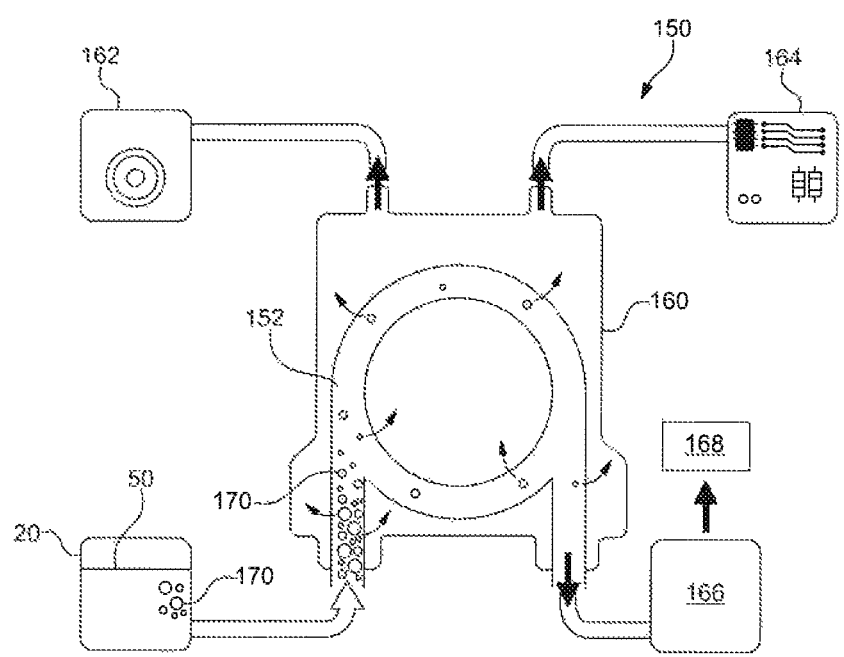
FIG. 7 illustrates a commercially available degassing chamber that can be incorporated into the system for large scale commercial use of an embodiment of the method according to the present invention.

Although the system 100 described above is designed for manual operation, automated controls are envisioned for large-scale commercial use of the method. Toward that end, FIG. 7 illustrates a vacuum degasser 150 that is commercially available from Idex Health & Science LLC of Northbrook, Ill. The critical component of the vacuum degasser 150 is a short length of Systec AF® tubing 152 through which the distillate 50 flows from the tank 20 after being pulled through the wood slabs 30. The tubing 152 is located in a chamber 160 where a partial vacuum is maintained by a vacuum pump 162 that is constantly running at a low speed. Dissolved gasses migrate across the wall of the tubing 152 under a concentration gradient produced by the vacuum as the distillate 50 flows within the tubing 152 in accordance with Henry's law. The gasses form bubbles 170 and are expelled from the system 100. The chamber 160 is maintained at a constant, preset vacuum level by varying the speed of the vacuum pump 162, as needed, through a vacuum controller 164. A fluid pump 166 delivers the distillate 50 without the bubbles 170 to a reservoir 168 for further processing.

For hundreds of years American white oak barrels have been used to age whiskey. The embodiments of the method described above eliminate the need to age alcohol in oak barrels at all. Thus, the disadvantages of using oak barrels are avoided. The method accelerates the aging of the alcohol and allows for production of whiskey within 15 to 30 days.

The method is done advantageously at room temperature, without any heat or any pressure increase above atmospheric pressure. The method does not require the use of any additives or flavor-modifying agents. Rather, the method is purely mechanical and may be generally described as a cyclic vacuum method because the characterizing feature of the method is the application of vacuum to distilled spirits intermittently for periods of relatively short duration. Although the method is conducted on the distilled beverage while the distillate 50 is in the green state, before aging, the method steps could be applied to the distillate 50 after aging with noticeable flavor improvement. Thus, the method can be applied to improve the flavor of whiskies of inferior quality.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A method for producing aged whiskey comprising:
   (a) providing a system including a tank with a lid and a degasser connected via a conduit to a tube having a vacuum valve, a pressure release valve, and a vacuum gauge;
   (b) providing charred wood slabs having dimensions of about 2 inches by 2 inches by 5-10 inches;
   (c) placing the slabs in the tank;
   (d) positioning pucks at intersections between the slabs to prevent the slabs from floating in the tank;
   (e) delivering to the tank distillate to be aged;
   (f) regulating the amount of vacuum developed in the tank;
   (g) energizing the degasser and opening the vacuum valve to subject the distillate to vacuum;
   (h) observing when bubbles appear, indicating that gas is coming to the surface of the distillate, then closing the vacuum valve and de-energizing the degasser;
   (i) holding the pressure in the system for approximately one minute;
   (j) slowly opening the pressure release valve, allowing the pressure to neutralize to atmospheric pressure;
   (k) closing the pressure release valve;
   (l) allowing the system to sit for at least 1.5 hours; and
   (m) repeating steps (f) through (l) in a cyclic pattern of aging, with a minimum of 1.5-hour intervals, for 21 days or more.

2. The method according to claim 1, wherein the charred wood slabs are submerged in clean water, with the water changed daily, for a period of at least five days.

3. The method according to claim 1, wherein the slabs are placed in the tank in at least two layers, a first layer placed in the bottom of the tank and at least a second layer placed diagonally on top of the first layer.

4. The method according to claim 1, wherein the tank has a capacity and the distillate is delivered to the tank in an amount sufficient to fill the tank to about 95% of its capacity, allowing room for expansion.

5. The method according to claim 1, wherein the step (f) includes placing a lid on top of the tank.

6. The method according to claim 1, wherein, in step (g) the vacuum valve remains open until bubbles appear.

7. The method according to claim 1, wherein in step (j) the pressure release valve is opened over a period of 2-to-3 seconds.

8. The method according to claim 1, further comprising the step of conducting a taste and sight test when the product shows a dark amber color.

9. The method according to claim 8, further comprising the step, once the product has achieved an acceptable taste and color, of siphoning the product from the tank into an activated charcoal filter to remove any charred particles that the product might carry.

10. The method according to claim 9, further comprising the step of bottling the product.

11. The method according to claim 1, wherein the step (j) includes introducing an oxygen-enriched atmosphere into the tank to achieve pressure neutrality.

12. The method according to claim 11, further comprising moving the distillate in the tank at pre-determined steps in the method.

13. The method according to claim 1, wherein the method steps are conducted at room temperature, without any heat or any pressure increase above atmospheric pressure.

14. The method according to claim 1, wherein the method avoids the use of wooden barrels.

15. A method for producing aged whiskey at room temperature, without any heat or any pressure increase above atmospheric pressure and while avoiding the use of wooden barrels, the method comprising:
   (a) providing a system including a tank with a lid and a capacity, a degasser connected via a conduit to a tube having a vacuum valve, a pressure release valve, and a vacuum gauge;
   (b) providing charred wood slabs having dimensions of about 2 inches by 2 inches by 5-10 inches;
   (c) placing the slabs in the tank in at least two layers, a first layer placed in the bottom of the tank and at least a second layer placed diagonally on top of the first layer;
   (d) positioning pucks at intersections between the slabs to prevent the slabs from floating in the tank;
   (e) delivering to the tank distillate to be aged in an amount sufficient to fill the tank to about 95% of its capacity, allowing room for expansion;
   (f) regulating the amount of vacuum developed in the tank;
   (g) energizing the degasser and opening the vacuum valve to subject the distillate to vacuum;
   (h) observing when bubbles appear, indicating that gas is coming to the surface of the distillate, then closing the vacuum valve and de-energizing the degasser;
   (i) holding the pressure in the system for approximately one minute;
   (j) opening the pressure release valve over a period of 2-to-3 seconds, allowing the pressure to neutralize to atmospheric pressure;
   (k) closing the pressure release valve;
   (l) allowing the system to sit for at least 1.5 hours; and
   (m) repeating steps (f) through (l) in a cyclic pattern of aging, with a minimum of 1.5-hour intervals, for 21 days or more.

16. The method according to claim 15, further comprising the step of conducting a taste and sight test when the product shows a dark amber color.

17. The method according to claim 16, further comprising the step, once the product has achieved an acceptable taste and color, of siphoning the product from the tank into an activated charcoal filter to remove any charred particles that the product might carry.

18. The method according to claim 17, further comprising the step of bottling the product.

19. The method according to claim 15, wherein the step (j) includes introducing an oxygen-enriched atmosphere into the tank to achieve pressure neutrality.

20. The method according to claim 19, further comprising moving the distillate in the tank at pre-determined steps in the method.

\* \* \* \* \*